(12) United States Patent
Spiegel

(10) Patent No.: US 11,486,524 B2
(45) Date of Patent: Nov. 1, 2022

(54) PIPE FITTING

(71) Applicants: Doris Spiegel, Niederwerrn (DE);
Herbert Spiegel, Niederwerrn (DE)

(72) Inventor: Herbert Spiegel, Niederwerrn (DE)

(73) Assignees: Doris Spiegel, Niederwerrn (DE);
Herbert Spiegel, Niederwerrn (DE)

( * ) Notice: Subject to any disclaimer, the term of this patent is extended or adjusted under 35 U.S.C. 154(b) by 77 days.

(21) Appl. No.: 16/966,149

(22) PCT Filed: Jan. 23, 2019

(86) PCT No.: PCT/EP2019/051602
§ 371 (c)(1),
(2) Date: Jul. 30, 2020

(87) PCT Pub. No.: WO2019/149591
PCT Pub. Date: Aug. 8, 2019

(65) Prior Publication Data
US 2021/0033229 A1 Feb. 4, 2021

(30) Foreign Application Priority Data
Jan. 30, 2018 (DE) ..................... 10 2018 102 020.1

(51) Int. Cl.
*F16L 27/08* (2006.01)
*F16L 43/00* (2006.01)

(52) U.S. Cl.
CPC ....... *F16L 27/0837* (2013.01); *F16L 27/0841* (2013.01); *F16L 43/00* (2013.01)

(58) Field of Classification Search
CPC ............... F16L 27/0837; F16L 27/0841; F16L 27/0849

USPC ......................................................... 285/184
See application file for complete search history.

(56) References Cited

U.S. PATENT DOCUMENTS

| 2,354,416 | A |   | 7/1944 | Phillips |
| 2,479,580 | A | * | 8/1949 | Marco ................ F16L 27/0849 |
|   |   |   |   | 285/365 |
| 4,804,206 | A | * | 2/1989 | Wood ................. F16L 27/0841 |
| 6,114,631 | A |   | 9/2000 | Gretz |
| 6,550,817 | B1 |   | 4/2003 | Mitchell |
| 9,032,995 | B2 |   | 5/2015 | Spiegel |

(Continued)

FOREIGN PATENT DOCUMENTS

| AU |     507055 B1 | 1/1980 |
| DE | 102009025490 A1 | 1/2011 |

(Continued)

*Primary Examiner* — Zachary T Dragicevich
(74) *Attorney, Agent, or Firm* — Lucas & Mercanti, LLP; Klaus P. Stoffel

(57) ABSTRACT

A pipe fitting for conveying a medium, including an inlet at which the medium enters in a first direction perpendicular to an inlet cross section, and an outlet at which the medium leaves in a second direction perpendicular to an outlet cross section, wherein the two directions enclose an angle. The pipe fitting has three parts, wherein in each case two parts bearing against one another at a contact point, wherein in each case two parts at their contact point being rotatable relative to one another about the axis of the flow direction at the contact point in order to change the angle, and wherein the two contact points being spaced apart from one another in the flow direction.

9 Claims, 9 Drawing Sheets

(56) References Cited

U.S. PATENT DOCUMENTS

2005/0145727 A1     7/2005   Steingass
2007/0246258 A1*   10/2007   Magno ................ F16L 27/0841
2008/0261428 A1    10/2008   Brodeur
2017/0016559 A1*    1/2017   Chung ................ F16L 27/0841
2017/0299101 A1*   10/2017   Singer ................ F16L 27/0841

FOREIGN PATENT DOCUMENTS

EP           2606285 B1    3/2017
WO          8400594 A1    2/1984

\* cited by examiner

PIPE FITTING

The present application is a 371 of International application PCT/EP2019/051602, filed Jan. 23, 2019, which claims priority of DE 10 2018 102 020.1 of Jan. 30, 2018, the priority of these applications is hereby claimed and the applications are incorporated herein by reference.

BACKGROUND OF THE INVENTION

The invention relates to a pipe fitting as part of a water pipe for conveying water, comprising an inlet at which the water enters in a first direction perpendicular to a circular inlet cross section, and an outlet at which the water leaves in a second direction perpendicular to a circular outlet cross section, wherein the two directions enclose an angle, wherein the pipe fitting consists of three parts, wherein in each case two parts bearing against one another at a contact point, wherein in each case two parts at their contact point being rotatable relative to one another about the axis of the flow direction at the contact point in order to change the angle, and wherein the two contact points being spaced apart from one another in the flow direction.

WO 84/00594 A1 shows a pipe fitting of the generic kind. Similar and other solutions are shown in US 2005/145727 A1, in U.S. Pat. No. 2,354,416 A, in US 2008/261428 A1, in AU 507 055 B2, in U.S. Pat. No. 6,550,817 B1 and in U.S. Pat. No. 6,114,631 A.

Otherwise, pipe fittings of this type are sufficiently well known in the state of the art and are mostly used as one-piece elements. A desired angle is enclosed between the inlet and the outlet, so that the medium, which is led through the pipe fitting, is deflected accordingly. This is necessary for various applications in pipeline construction, especially for water pipes.

A particular problem arises if a circulation pipe is to run inside the pipe fitting, as is the preferred use. For the relevant technology, explicit reference is made to EP 2 606 285 B1, which describes this case of application.

The use of a pipe fitting (also known as an elbow) is also known in the field of pipe installation technology. The pipe fittings are usually manufactured and used in 90° and 45° variants. For this purpose, a large stock must be kept on hand in order to have a corresponding pipe fitting for the pipe system for every desired change of direction, i.e. every desired deflection angle.

With the composite pipe technology, the bushings of the angles are produced by drilling. This has the disadvantage of considerably reducing the inner diameter, which leads to considerable pressure losses in the system. The use of an internal circulation—as explained in connection with EP 2 606 285 B1—is not possible with this pipe fitting.

With standard fittings, the insertion of an internal circulation pipe is only possible to a limited extent or with the use of auxiliary means. A further disadvantage is the inflexibility of the pipe fittings in the installation technology.

DE 10 2009 025 490 A1 describes a supply line, wherein a line section is pivotably arranged in a housing part, here in the form of an internal combustion engine, for which purpose an O-ring-like sealing element is arranged at the axial end of the line section, which surrounds the outer circumference of the line section and is slidably arranged in a cylindrical bore of the housing.

SUMMARY OF THE INVENTION

The present invention is based on the object to further develop a pipe fitting of the type mentioned above in such a way that improved installation conditions can be achieved, especially when an internal circulation pipe is arranged. Furthermore, the flow conditions through the fitting are to be improved. In particular, this is intended to improve hygiene requirements. Accordingly, especially with an internal circulation, easy installation in pipe installations with pipe fittings should also be guaranteed. Furthermore, a higher degree of flexibility in the elbow technology for pipe systems is aimed for.

The solution of this object by the invention is characterized in that a circulation pipe is arranged in the flow path for the water, wherein the parts being designed such that, in a first relative position, they have an essentially straight course of the flow path through the interior of the pipe fitting and such that, in a second relative position, they form a non-zero angle between the two directions.

Thereby it is preferably provided that the part arranged between two parts produces a deflection of the water by a first partial angle, wherein the two parts adjacent to this part each produce a deflection of the water by a second partial angle which is different from the first partial angle.

The first partial angle is preferably between 40° and 50°, especially preferred 45°. The second partial angle is preferably between 20° and 25°, especially preferred 22.5°.

The two parts arranged in the axial end region of the pipe fitting are preferably formed identically.

Two parts lying against one another at a contact point can thereby be connected to one another by positive-locking connecting means; here in particular a union nut is considered which is screwed onto an appropriate thread.

But it is also possible that two parts lying against one another at a contact point are connected to one another by non-positive connecting means. A snap-on connection is particularly useful here, which connects two parts together. When using such a snap connection to fix two adjacent parts of the pipe fitting, a snap ring can be used which snaps into a groove-shaped recess and thus ensures that the two parts are connected.

The portion of the part lying in the axial end area of the pipe fitting is preferably designed for connection to a composite pipe or for connecting a pipe by means of a screw connection. Accordingly, a screw connection can be used to connect a pipe or line to the pipe fitting, but also the connection of a composite pipe.

The invention also provides that a circulation pipe is arranged in the flow path for the water. This particularly preferred use of the described pipe fitting is very advantageous when a solution according to the above-mentioned EP 2 606 285 B1 is used, to which explicit reference is made again here.

The proposed pipe fitting, which functions as a pipe connection, is suitable for liquid, gaseous or solid media, whereby the use of internal pipes is also possible in particular. The proposed design allows variable directional changes even after installation or assembly, i.e. a change in the angle between the inlet and outlet.

According to the invention the pipe fitting has three parts, namely an intermediate part and two end connection parts, which are located on both sides of the intermediate part. The individual parts have suitable connecting elements in order to be able to be connected to each other and also to join adjoining pipelines tightly; this can be done by screwing (via threads), by pressing (press-fit grooves) or by plugging (push-in fitting) the individual parts, if necessary with the necessary seals. In general, it is also possible to use welding or bonding for the corresponding connection.

The design according to the invention of the proposed pipe fitting, as described above, therefore consists of three parts. The part in the middle and the two outer parts at the ends form the pipe fitting, whereby the two end parts are preferably identical. If different pipe systems are to be used, only the two outer parts need to be adapted. The part in the middle can usually always be used unchanged.

The individual parts can be connected by pressing, screwing or by a plug or snap connection. Bolting as a detachable connection is occasionally preferred.

The part in the middle has sealing surfaces and threads (preferably external threads) for screwing in union nuts (lock nuts). Depending on the application, the sealing surfaces used can be flat-sealing, metallic, with hard seals, rolling rings or in some other way.

The two outer parts at the end of the pipe fitting preferably also have a sealing surface, which are designed to match the intermediate part depending on the application. Due to the different design of the outer parts, any pipe system can be used, also for example in combination of different systems, e.g. one end outer part for a thread, the other end outer part for a composite pipe.

Due to the rotational position of the central part relative to the end parts, the pipe fitting can be adjusted to a wide variety of angles. A preferred design provides for the intermediate part in the middle to have a 45° deflection and the outer end parts to each have a 22.5° deflection. This means that the standard angle sizes of 45° and 90° for the pipe fitting that are usually aimed for can be achieved without any problems, and without restricting the internal diameter. In this position, there are also no stagnation areas, so that hygienic use is guaranteed.

The pressure losses with conventional pipe fittings, especially for composite pipe systems, are considerable due to the constrictions inside them. This problem can be permanently eliminated with the proposed solution. This applies with regard to the entire set angular range to which the pipe fittings in accordance with the invention are adjusted.

By changing the relative rotational position of two adjacent parts of the pipe fitting, any angle size can be flexibly adjusted within certain limits. This is especially true when a setting is selected where the angle between the inlet and outlet is zero degrees. Accordingly, there is preferably an adjustable angle range between 0° and 90°.

Significant advantages are also achieved when an internal circulation line is to be installed in the pipe and especially in the pipe fitting. With regard to this application, explicit reference is made to EP 2 606 285 B1. In this case, if a basic setting is selected (essentially a straight course of the pipe fitting), it is initially possible to push the internal circulation pipe through the pipe fitting without any problems; this also applies if several fittings are installed in series. An adjustment to the desired angular position of the fitting (e.g. 45° or 90°) is then only carried out at a later point in time, namely when the internal circulation pipe has been installed.

The proposed pipe fitting also has advantages in storage technology, e.g. when using storage swords made of plastic or corrugated stainless steel pipe. Up to now, installation could only be carried out using a straight component, which required considerable space during installation (e.g. with regard to safety devices, pumps, etc.). With the proposed pipe fitting the installation of the circulation sword can be carried out much easier. This is because only after the installation is the adjustment to the desired or correct angular position carried out again.

In systems with internal pipelines (circulation pipes) it is sometimes difficult to lead the line out of the pipe systems. From a flow and hygiene point of view, it is preferable to use a pipe fitting with an outlet in the form of an acute angle to lead the internal pipe out. The proposed pipe fitting connected to such a component allows an uncomplicated connection to downstream or upstream components (e.g. a pump, a scald protection, etc.).

A further advantage of the proposed pipe fitting is that the intermediate part (middle part in the case of a three-part design of the fitting) and the two outer parts are manufactured in a push-in design. The (union) nuts for fixing can then be omitted, a tool for screwing or pressing is then not required. Thus, when using the proposed pipe fitting, the flexibility in the installation technique is considerably greater. A possible sealing can be done with integrated seals. The material requirements for this variant are considerably reduced, so that resources can be saved. The plug connections can be designed in a non-detachable or detachable connection variant.

All mentioned designs of the proposed pipe fitting offer the advantage of high flexibility; all known pipe systems can be used for the different designs of the parts. A combination of different systems is also possible.

The various combination possibilities are also advantageous in the case of a straight version, where the parts are designed without an angled configuration.

The material for the pipe fitting is expertly selected and adapted according to the application.

While the proposed pipe fitting is mainly used for water pipes, it can also be used for general hydraulic systems.

The individual parts of the pipe fitting are preferably designed in the same dimensions; however, it is also possible that different dimensions are used for the individual parts (e.g. 1 inch/¾ inch).

In an advantageous way, there is no constriction or narrowing inside the pipe fitting, which is particularly advantageous from a hygienic point of view in water pipes.

In the drawings embodiments of the invention are shown.

DETAILED DESCRIPTION OF THE INVENTION

Figure 1:
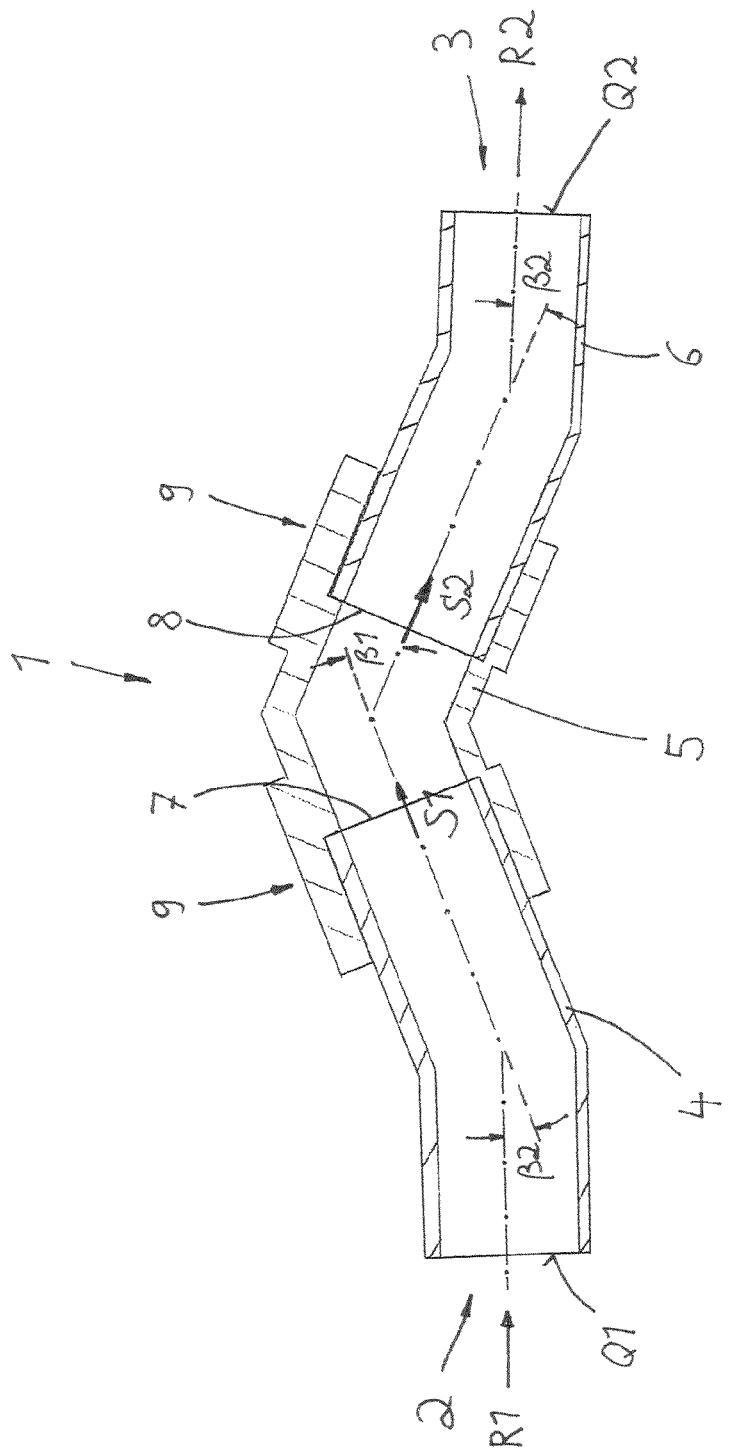
FIG. 1 shows in a sectional side view a pipe fitting consisting of three parts and mounted in a first relative position of the individual parts.

FIG. 1 shows a pipe fitting 1, for example, for conveying drinking water, which has an inlet 2 and an outlet 3.

Inlet 2 has an inlet cross section Q1, to which, standing perpendicular, a first direction R1 results, in which the medium to be pumped enters the pipe fitting.

Similarly, outlet 3 has an outlet cross section Q2, to which in turn, standing perpendicular, a second direction R2 results, in which the medium to be pumped exits the pipe fitting.

The pipe fitting 1 consists of three parts 4, 5 and 6, namely a centrally arranged part 5, which is followed by an end part 4 or 6. Two adjoining parts contact each other at a contact point 7 or 8. As can be seen in FIG. 1, a contact point 7 or 8 has to be understood as the axial end of a part 4 or 6 with which it is seated in part 5.

To connect two adjacent parts, connecting means 9 are available, which are described in detail in FIG. 4 below.

Two adjacent parts 4 and 5 or 5 and 6 can be rotated relative to each other in the area of contact point 7 or 8; the axis of rotation is therefore defined by the flow direction S1 or S2 at contact point 7 or 8.

Figure 2:
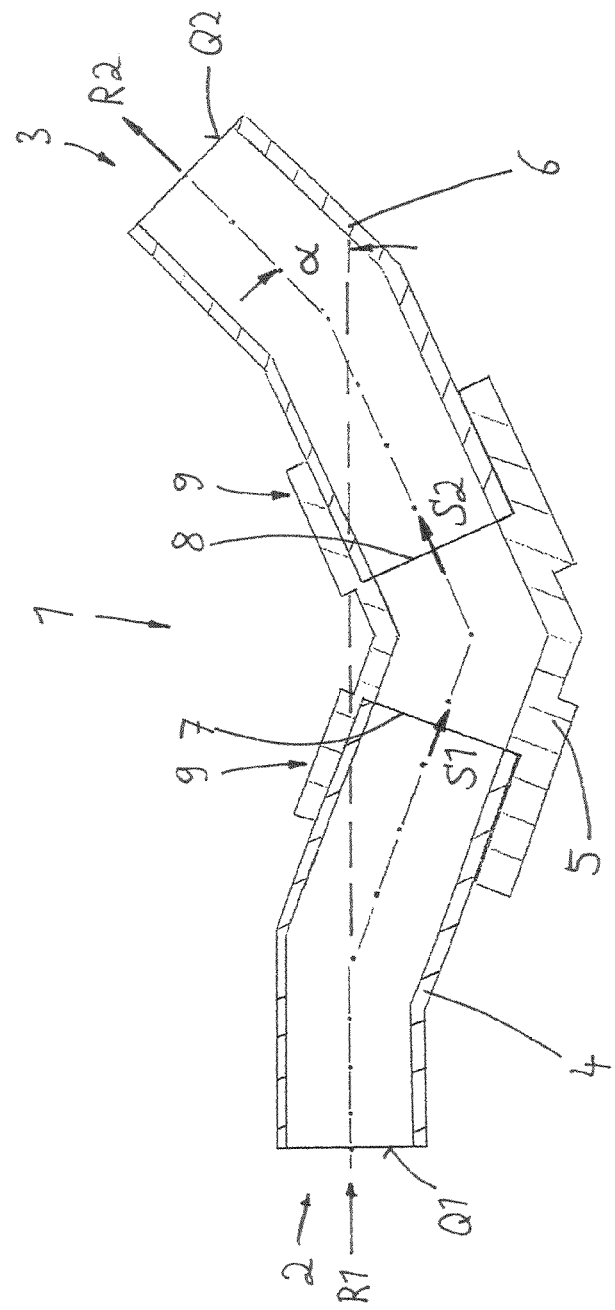
FIG. 2 shows in the view according to FIG. 1 the pipe fitting, which is now mounted in a second relative position of the individual parts.
Figure 3:
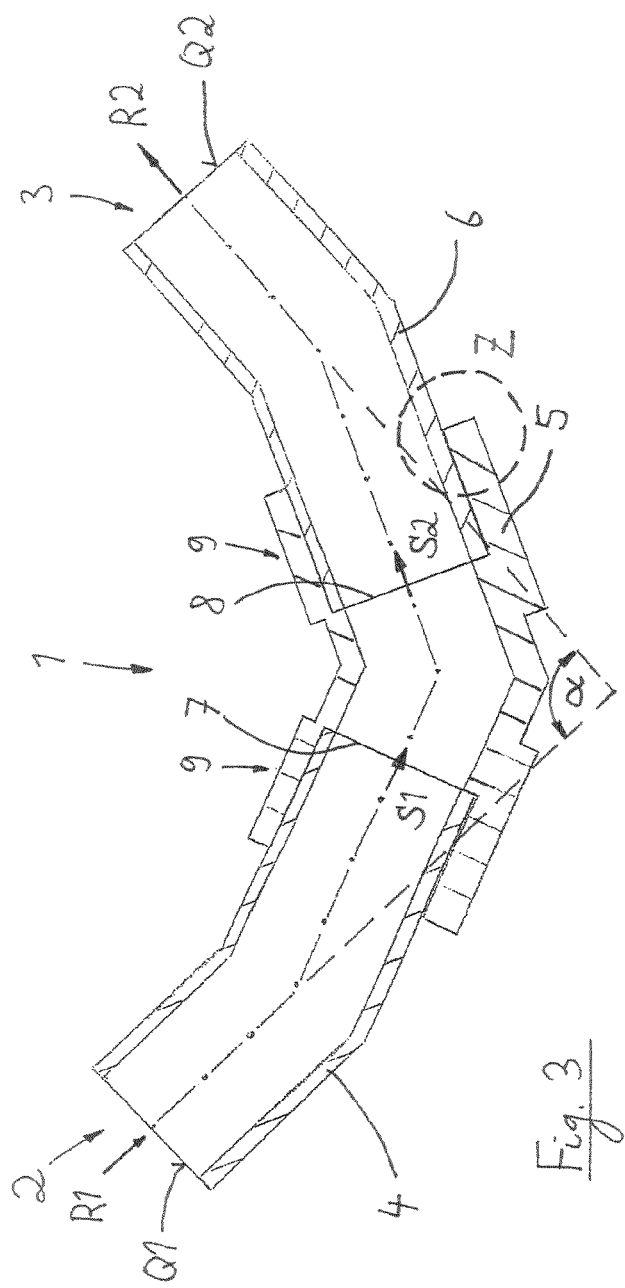
FIG. 3 shows in the view according to FIG. 1 the pipe fitting, which is now mounted in a third relative position of the individual parts.

Thus, different relative positions of the parts can be realised, which is illustrated in FIGS. 1, 2 and 3.

To illustrate this, an angle has been entered in FIGS. 2 and 3, which results from the position of the first and second directions R1 and R2. In FIG. 1 this angle is 0°, i.e. the directions R1 and R2 are identical.

However, in the constellation shown in FIGS. 2 and 3, the adjacent parts 4 and 5 or 5 and 6 have been positioned so as to form an angle of 45° in the case of FIG. 2 and 90° in the case of FIG. 3.

In order to provide the various adjustment possibilities mentioned above, both the central part 5 and the two identical end parts 4 and 6 have a first partial angle b1 and a second partial angle b2 as shown in FIG. 1. In the embodiment, for the central part 5 of the pipe fitting 1 the partial angle b1 is 45°, while the two end parts 4 and 6 each have a partial angle b2 of 22.5°. These partial angles thus indicate the angle by which the pumped medium is deflected when it flows through the parts 4, 5 and 6 in question.

As can be seen from the overview of FIGS. 1 to 3, the proposed design makes it very easy to vary and adjust the angle a, which indicates the total deflection of the pumped medium through the entire pipe fitting 1.

Figure 4:
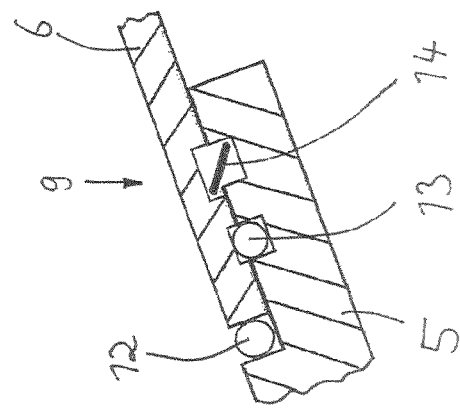
FIG. 4 shows detail "Z" according to FIG. 3.

FIG. 4 shows one possible design of the connecting means 9. According to this, part 5 is to contain an annular groove into which a retaining element 14 is inserted; the retaining element can be designed in the form of a retaining spring, a tilt or a snap ring. In part (4 or) 6 there is a corresponding annular groove in which the retaining element 14 can engage when the two parts 4 and 5 or 6 and 5 are inserted and pushed together. Seals 12 and 13 are provided to ensure tightness; these can be designed as O-rings. In this way, a snap connection can be realized in a simple way, for example, with which two adjacent parts 4 and 5 or 5 and 6 can be reliably and tightly connected to each other.

The positioning of the seals 12 and 13 or the retaining element 14 is possible in any way in the interacting and connecting parts 4 and 5 or 5 and 6. An arrangement in the middle part 5 is preferred. An arrangement in the middle part 5 has advantages, e.g. protection against direct wear or destruction by external influences on the seals or on the retaining element. The material requirement is also lower in this case.

The retaining element 14 can be designed as a detachable connection (for example with springs) or as a non-detachable connection.

Figure 5:
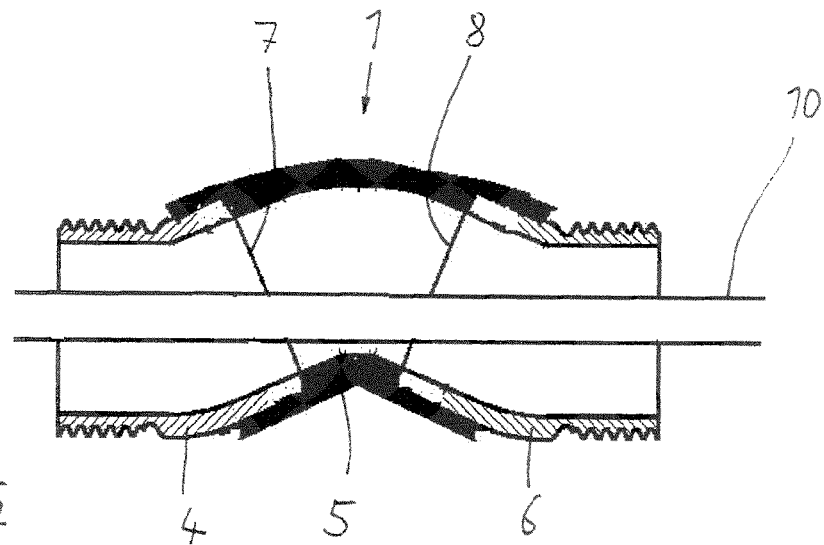
FIG. 5 shows in a sectional side view the pipe fitting according to an alternative design, whereby the individual parts are in a position similar to FIG. 1 and whereby a circulation pipe is inserted into the pipe fitting.

The proposed design of the pipe fitting 1 is particularly advantageous if a circulation pipe 10 is to be installed inside the pipe fitting 1, as shown in FIG. 5. The main difference to the pipe fitting 1 as shown in FIGS. 1 to 3 is that the ends of parts 4 and 6 facing away from the middle part 5 are provided with threads which serve to connect corresponding pipes by means of a screw connection.

Figure 6:
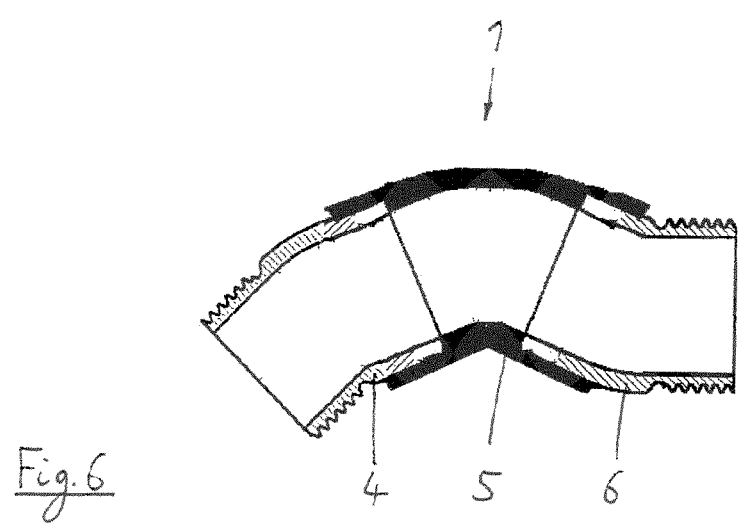
FIG. 6 shows the pipe fitting as shown in FIG. 5 (but now without the circulation pipe), whereby it is now brought into a position similar to FIG. 2.
Figure 7:
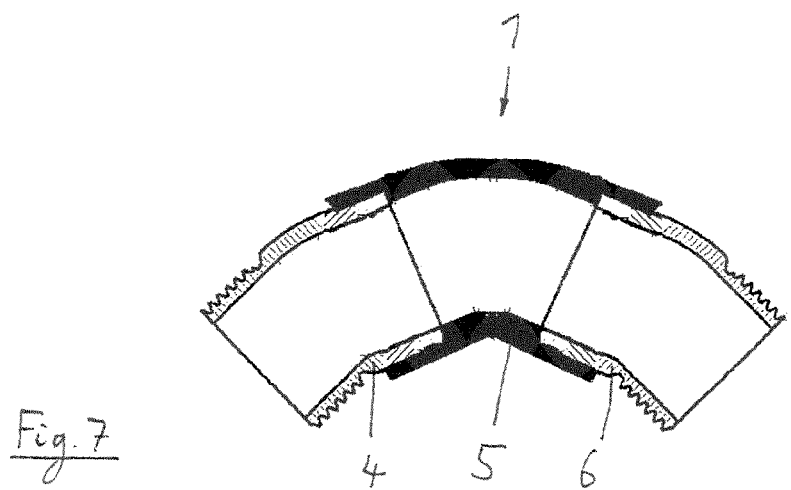
FIG. 7 shows the pipe fitting according to FIG. 5 (again without circulation pipe), whereby it is now brought into a position similar to FIG. 3.

Otherwise, FIG. 5 shows how the circulation pipe 10 has been inserted in a position of parts 4, 5 and 6 where the two directions R1 and R2 (see FIG. 1) do not yet form an angle and therefore the insertion of circulation pipe 10 is possible without any problems. Then the individual parts 4, 5, 6 of the pipe fitting 1 can be turned into the positions shown in FIGS. 6 and 7, whereby the circulation pipe (not shown in FIGS. 6 and 7) follows the course of pipe fitting 1.

Figure 8:
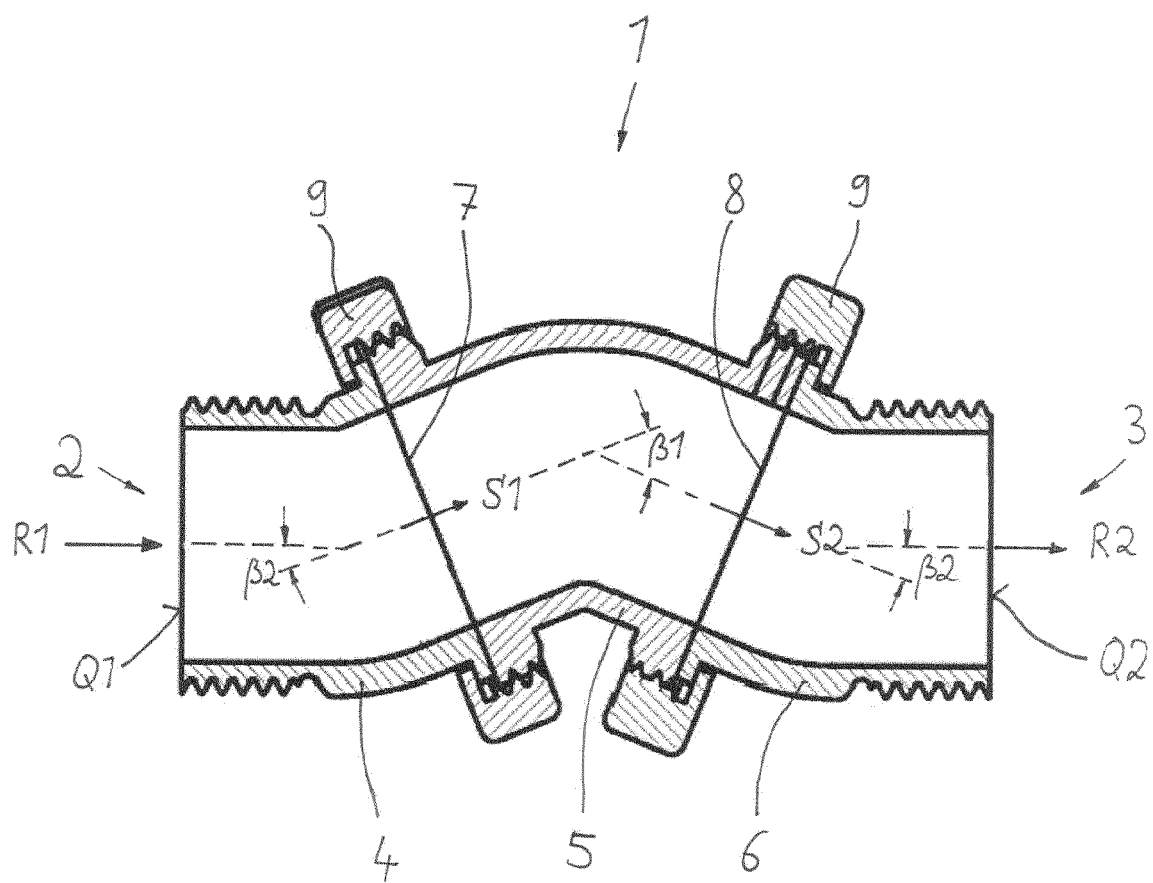
FIG. 8 shows in a sectional side view an alternatively designed pipe fitting consisting of three parts and mounted in a first relative position of the individual parts.

FIG. 8 shows a pipe fitting 1 according to an alternative design. The general design corresponds to the prescribed solution.

Again, pipe fitting 1 consists of the three parts 4, 5 and 6. Two adjoining parts contact each other again at a contact point 7 or 8. To connect two adjoining parts, connection means 9 are available here as well, which, however, are formed by a union nut that interacts with a corresponding thread.

Two adjoining parts 4 and 5 or 5 and 6 can be rotated relative to each other in the area of contact point 7 or 8; the axis of rotation is again defined by the flow direction S1 or S2 present at contact point 7 or 8. This relative rotation is possible as long as the connecting means 9 are not yet effective (i.e. as long as the union nut has not yet been tightened in this embodiment). As long as said relative rotation of parts 4 and 5 or 5 and 6 is still possible, different relative positions of the parts can be realised, which is illustrated in FIGS. 8, 9 and 10.

The same applies to the angular relationships as explained in connection with FIGS. 1 to 3.

Figure 9:
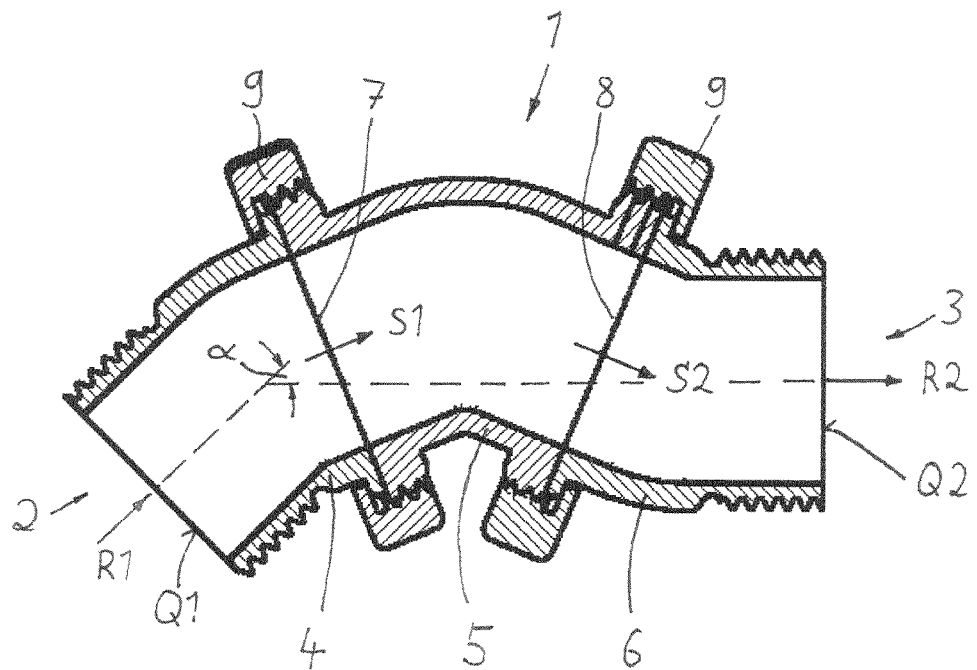
FIG. 9 shows in the view shown in FIG. 8 the pipe fitting, which is now mounted in a second relative position of the individual parts.
Figure 10:
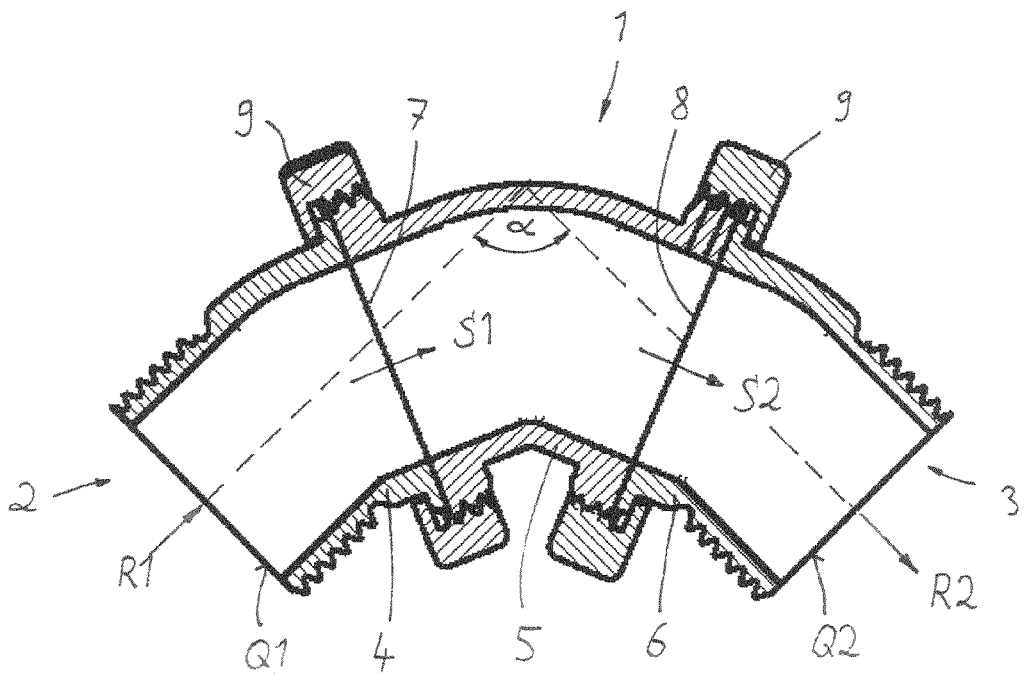
FIG. 10 shows in the view shown in FIG. 8 the pipe fitting, which is now mounted in a third relative position of the individual parts.

Thus, as can be seen from the synopsis of FIGS. 8 to 10, the proposed design makes it very easy to vary and adjust the angle a, which indicates the total deflection of the pumped medium through the entire pipe fitting 1.

Figure 11:
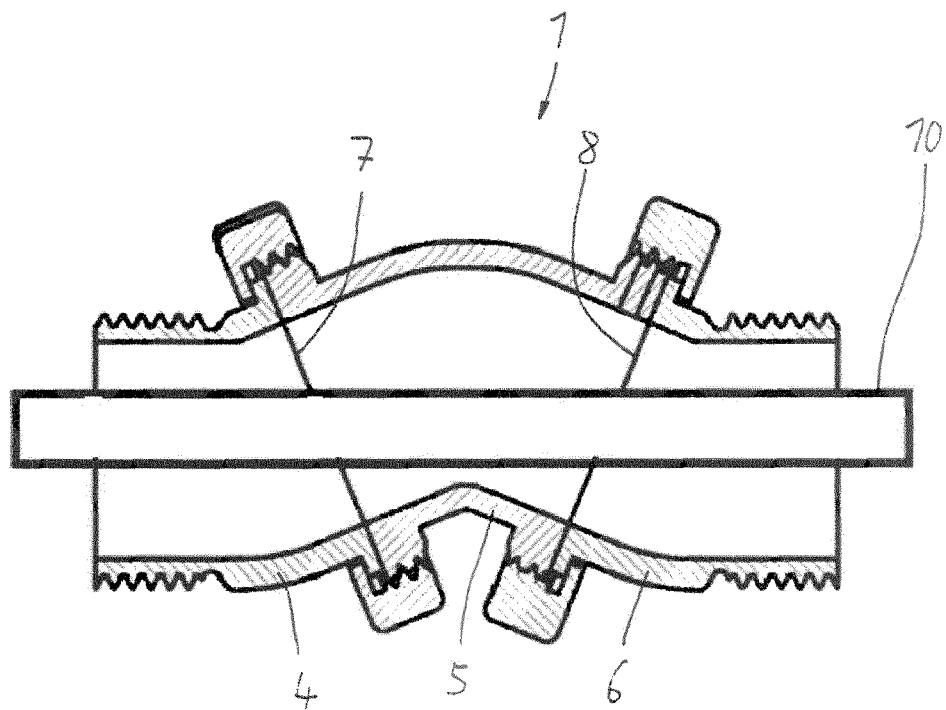
FIG. 11 shows in a sectional side view the pipe fitting as shown in FIG. 8, into which a circulation pipe is inserted, showing a condition before completion of the assembly.
Figure 12:
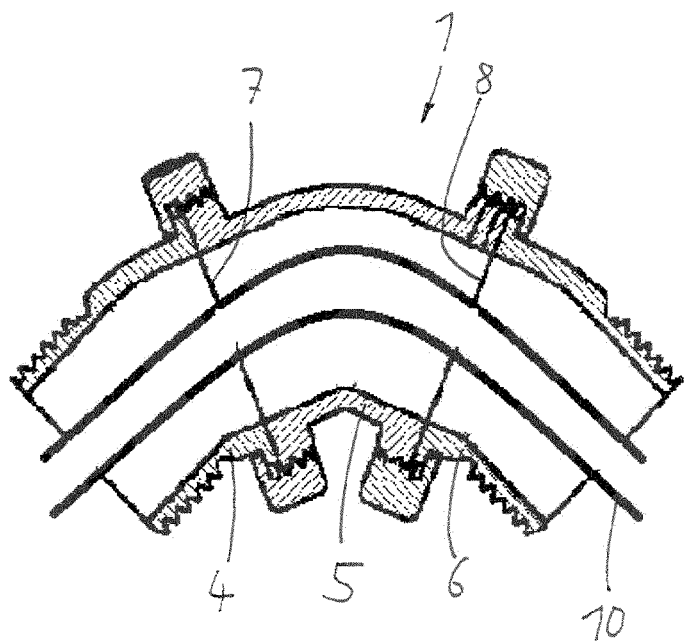
FIG. 12 shows in the illustration according to FIG. 11 the pipe fitting including the circulation pipe, whereby the condition after completion of the assembly is shown.

This is again particularly advantageous when a circulation pipe 10 is to be installed inside the pipe fitting 1, as illustrated in FIGS. 11 and 12. Referring again to EP 2 606 285 B1, the insertion of circulation pipe 10 is problematic if this is to be done with a classic pipe fitting, especially since circulation pipe 10 usually consists of a relatively stiff plastic pipe.

However, if the position of the proposed pipe fitting 1 (with the union nuts not yet tightened) is set first, as shown in FIG. 11, the circulation pipe 10 can be inserted through the pipe fitting without any problems, as this results in a substantially straight flow path through the inside of the pipe fitting. Once circulation pipe 10 is inserted, parts 4 and 5 or 5 and 6 are rotated relative to each other to the desired position, as shown in FIG. 12. Now, with a given deflection (by the angle a) the union nuts are tightened so that the arrangement as shown in FIG. 12 is achieved.

Figure 13:
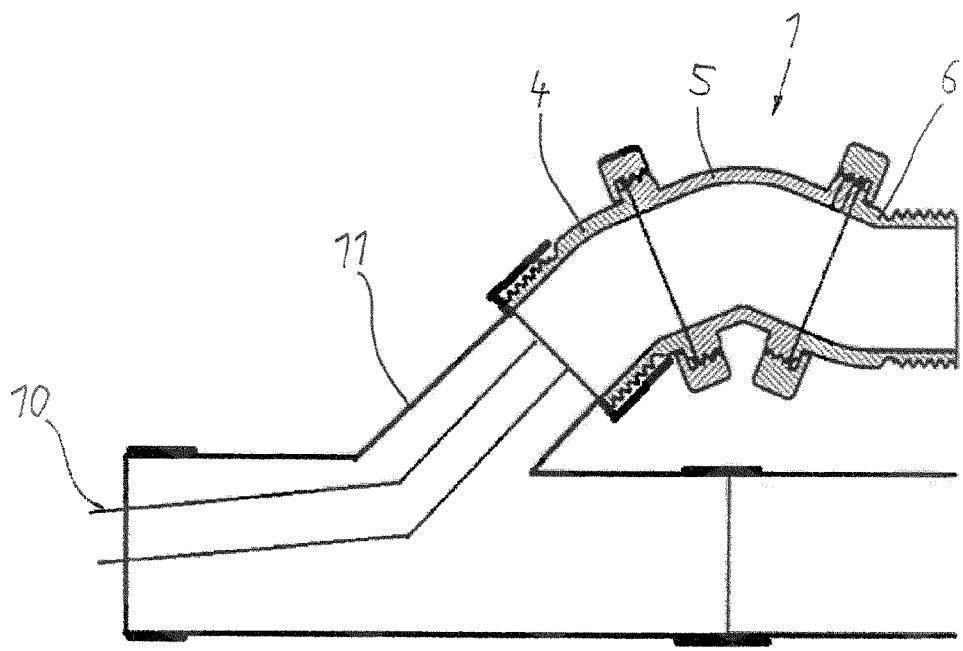
FIG. 13 shows a design of the pipe fitting according to the invention mounted on a T-piece of a water pipe.

FIG. 13 shows an application in which pipe fitting 1 was connected to a T-piece 11. Again, a circulation pipe 10 is provided here, which can be easily inserted into pipe fitting 1 in the manner described (analogous to the illustration in FIGS. 11 and 12).

Figure 14:
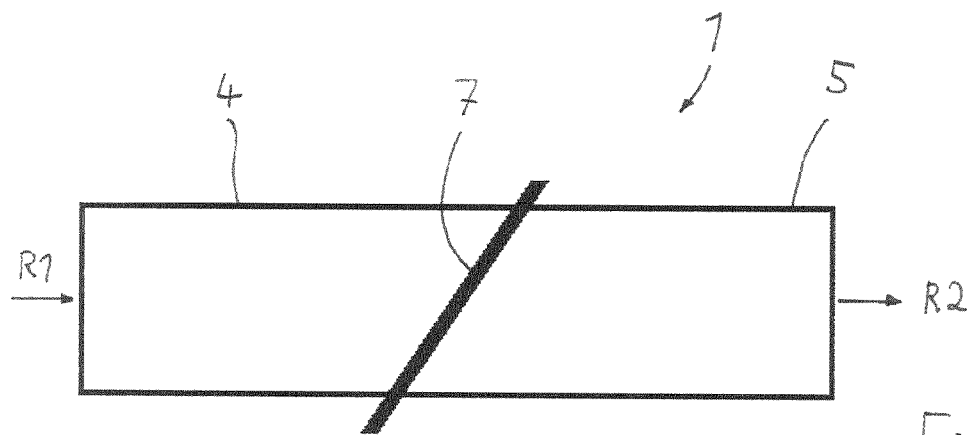
FIG. 14 shows schematically in the side view a different embodiment of the pipe fitting not according to the invention, which here consists of two parts, namely in a first relative position of the two parts.
Figure 15:
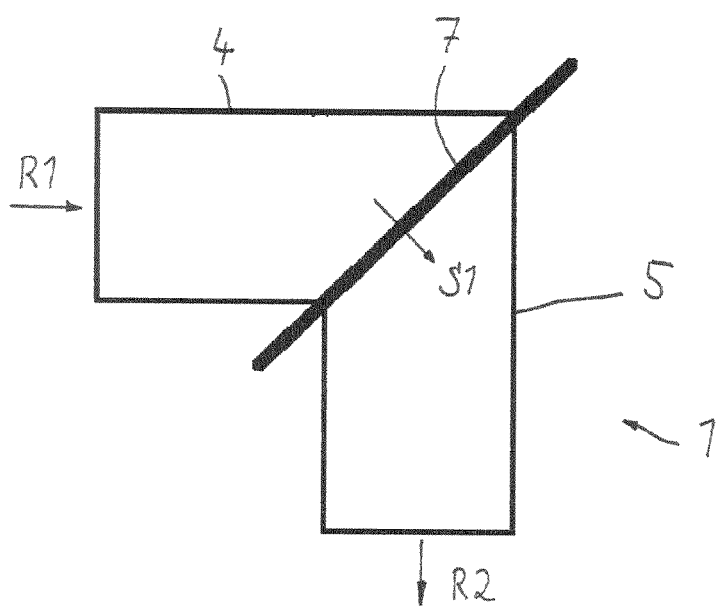
FIG. 15 shows the pipe fitting according to FIG. 14 in a second relative position of the two parts.

The proposed principle for the design of a pipe fitting can be further simplified as shown in FIGS. 14 and 15. The simplest possibility of designing a pipe fitting, that is not in accordance with the invention, is depicted here. Pipe fitting 1 consists of two parts 4 and 5, which can be rotated relative to each other.

FIG. 14 shows a situation where there is a zero degree angle between the first direction R1 and the second direction R2, while in FIG. 15 there is a 90° deflection.

Thus, in this simplest case, the pipe fitting consists of the two parts 4 and 5, which allows easy adjustment at a 90° angle. In other positions there are edges and stagnation areas; the inner free diameter is restricted here. This requires that the sealing and connecting parts must be correspondingly larger.

LIST OF REFERENCES

1 Pipe fitting
2 Inlet
3 Outlet
4 Part of the pipe fitting
5 Part of the pipe fitting
6 Part of the pipe fitting
7 Contact point
8 Contact point
9 Connection means
10 Circulation pipe
11 T-piece
12 Seal (O-Ring)
13 Seal (O-Ring)
14 Retaining element (retaining spring/tilt/snap ring)
R1 First direction
R2 Second direction
Q1 Inlet cross section
Q2 Outlet cross section
S1 Flow direction
S2 Flow direction
a Angle
b1 First partial angle
b2 Second partial angle

The invention claimed is:

1. A pipe fitting as part of a water pipe for conveying water, comprising: an inlet at which the water enters in a first direction perpendicular to an inlet cross section;
an outlet at which the water leaves in a second direction perpendicular to an outlet cross section, wherein the two directions enclose an angle;
three parts, wherein one of the three parts is arranged between the other two of the three parts, wherein in each case two of the parts bear against one another at a contact point, wherein in each case the two parts at their contact point are rotatable relative to one another about the axis of the flow direction at the contact point in order to change the angle, and wherein the two contact points are spaced apart from one another in the flow direction; and
a circulation pipe arranged in the flow path for the water, wherein the parts being designed such that, in a first relative position, they have an essentially straight course of the flow path through the interior of the pipe fitting and such that, in a second relative position, they form a non-zero angle between the two directions, wherein the one part arranged between the two other parts produces a deflection of the water by a first partial angle, wherein the two parts adjacent to this part each produce a deflection of the water by a second partial angle which is different from the first partial angle.

2. The pipe fitting according to claim 1, wherein the first partial angle is between 40° and 50°.

3. The pipe fitting according to claim 2, wherein the first partial angle is 45°.

4. The pipe fitting according to claim 2, wherein the second partial angle is 22.5°.

5. The pipe fitting according to claim 1, wherein the second partial angle is between 20° and 25°.

6. The pipe fitting according to claim 1, wherein the two parts arranged in the axial end region of the pipe fitting are formed identically.

7. The pipe fitting according to claim 1, wherein the two parts lying against one another at a contact point are connected to one another by positive-locking connecting means.

8. The pipe fitting according to claim 1, wherein the two parts lying against one another at a contact point are connected to one another by non-positive connecting means.

9. The pipe fitting according to claim 1, wherein a portion of a part lying in an axial end region of the pipe fitting is configured for connection to a composite pipe or for connecting a pipe by a screw connection.

* * * * *